United States Patent
Kakuma

(10) Patent No.: US 11,545,306 B2
(45) Date of Patent: Jan. 3, 2023

(54) ELECTROLYTIC CAPACITOR

(71) Applicant: SUN Electronic Industries Corp., Shijonawate (JP)

(72) Inventor: Kenji Kakuma, Shijonawate (JP)

(73) Assignee: SUN Electronic Industries Corp., Shijonawate (JP)

( * ) Notice: Subject to any disclaimer, the term of this patent is extended or adjusted under 35 U.S.C. 154(b) by 28 days.

(21) Appl. No.: 16/973,669

(22) PCT Filed: Jul. 26, 2018

(86) PCT No.: PCT/JP2018/028097
§ 371 (c)(1),
(2) Date: Dec. 9, 2020

(87) PCT Pub. No.: WO2020/021679
PCT Pub. Date: Jan. 30, 2020

(65) Prior Publication Data
US 2021/0257166 A1 Aug. 19, 2021

(51) Int. Cl.
*H01G 9/028* (2006.01)
*H01G 9/00* (2006.01)
(Continued)

(52) U.S. Cl.
CPC ........... *H01G 9/028* (2013.01); *H01G 9/0036* (2013.01); *H01G 9/02* (2013.01); *H01G 9/035* (2013.01); *H01G 9/10* (2013.01); *H01G 9/151* (2013.01)

(58) Field of Classification Search
CPC ........ H01G 9/035; H01G 9/0036; H01G 9/10; H01G 9/028; H01G 9/02; H01G 9/151
See application file for complete search history.

(56) References Cited

U.S. PATENT DOCUMENTS 2,178,970 A * 11/1939 Ruben .................. H01G 9/02
427/80
2008/0002334 A1 1/2008 Kakuma et al.
(Continued)

FOREIGN PATENT DOCUMENTS

CN 101088132 A 12/2007
CN 101345138 A 1/2009
(Continued)

OTHER PUBLICATIONS

Office Action issued in corresponding Chinese Patent Application No. 201880094590.5, dated Sep. 3, 2021.
(Continued)

*Primary Examiner* — David M Sinclair
(74) *Attorney, Agent, or Firm* — Morgan, Lewis & Bockius LLP

(57) ABSTRACT

In an electrolytic capacitor having a capacitor element housed inside a body case where the capacitor element has a first electrode member and a second electrode member wound up with a separator in between and where the capacitor element holding an electrolyte solution, there is provided, between the first and second electrode members, a conductive polymer particle band in which conductive polymer particles of a conductive polymer in a dense state are disposed to extend in the longitudinal direction of the separator, the conductive polymer particle band contains a cellulose derivative, and the conductive polymer particle band is provided to cover, within at least one of regions on opposite sides of the center line of the separator in its lateral direction, one half or more of the region in the lateral direction.

14 Claims, 6 Drawing Sheets

(51) Int. Cl.
*H01G 9/15* (2006.01)
*H01G 9/02* (2006.01)
*H01G 9/10* (2006.01)
*H01G 9/035* (2006.01)

(56) References Cited

U.S. PATENT DOCUMENTS

| | | |
|---|---|---|
| 2008/0089012 A1 | 4/2008 | Kon et al. |
| 2009/0021893 A1 | 1/2009 | Kakuma et al. |
| 2009/0109602 A1 | 4/2009 | Kakuma et al. |
| 2012/0212880 A1 | 8/2012 | Ishimaru et al. |
| 2014/0272523 A1* | 9/2014 | Otsuka ............... H01M 4/04 524/544 |
| 2015/0111087 A1* | 4/2015 | Choi ............... H01M 50/409 429/144 |
| 2015/0279502 A1* | 10/2015 | Yamazaki ......... C08G 73/0266 252/500 |
| 2016/0240323 A1 | 8/2016 | Chacko et al. |
| 2017/0207032 A1 | 7/2017 | Uher et al. |
| 2017/0263347 A1 | 9/2017 | Yamazaki et al. |
| 2018/0047511 A1 | 2/2018 | Tsuda |
| 2018/0047521 A1* | 2/2018 | Tsuda ............... H01G 9/0425 |
| 2018/0218844 A1* | 8/2018 | Sato ............... H01G 9/151 |
| 2018/0277312 A1* | 9/2018 | Tsubaki ............ H01G 9/035 |

FOREIGN PATENT DOCUMENTS

| | | | |
|---|---|---|---|
| CN | 101425375 A | | 5/2009 |
| CN | 102646515 A | | 8/2012 |
| CN | 104718588 A | | 6/2015 |
| CN | 107851518 A | | 3/2018 |
| DE | 2249614 A1 | | 4/1974 |
| JP | 06036975 A | * | 2/1994 |
| JP | 2008-010657 A | | 1/2008 |
| JP | 2014-197661 A | | 10/2014 |
| JP | 2016-143750 A | | 8/2016 |
| KR | 10-2003-0058318 A | | 7/2003 |

OTHER PUBLICATIONS

International Search Report (with partial translation) dated Oct. 16, 2018, issued in corresponding International Patent Application No. PCT/JP2018/028097.
Office Action issued in corresponding Chinese Patent Application No. 201880094590.5, dated Apr. 24, 2022.
Communication dated Jan. 28, 2022 in European Patent Application No. 18927658.7.

* cited by examiner (a)  (b)

ELECTROLYTIC CAPACITOR

TECHNICAL FIELD

The present invention relates to electrolytic capacitors in which a capacitor element contains an electrically conductive polymer.

BACKGROUND ART

Patent Document 1 identified below discloses a known capacitor. This electrolytic capacitor has a capacitor element housed inside a body case in the shape of a bottomed cylinder, with the opening of the body case sealed with a sealing member such as rubber.

The capacitor element is formed by winding up an anode foil, which is coated with a dielectric coat, and an opposite cathode foil with a separator in between. The capacitor element is impregnated with a conductive polymer and an electrolyte solution. The capacitor element is immersed in a liquid dispersed with particles of a conductive polymer, and is then taken out of the liquid and dried; in this way, the capacitor element is impregnated with the conductive polymer. Moreover, the capacitor element is immersed in an electrolyte solution so that the capacitor element is impregnated with the electrolyte solution.

In the electrolytic capacitor structured as described above, the conductive polymer is disposed between the anode foil and the opposite cathode foil, and this helps reduce the ESR of the electrolytic capacitor. Also, the electrolyte solution acts to repair defects in the dielectric coat, and this helps increase the withstand voltage of the electrolytic capacitor.

CITATION LIST

Patent Literature

Patent Document 1: Unexamined Japanese Patent Application Publication No. 2008-10657 (pages 4-13, FIG. 1).

SUMMARY OF INVENTION

Technical Problem

In the known electrolytic capacitor mentioned above, the capacitor element has the anode foil, the separator, and the opposite cathode foil arranged in close contact with each other radially. When the capacitor element taken out of the liquid dispersed with particles of the conductive polymer is dried, the dispersion medium seeps out axially with respect to the capacitor element. At this time, together with the dispersion medium that flows rapidly, the particles of the conductive polymer move axially and concentrate in an axial end part of the capacitor element. This leaves a large area between the anode foil and the opposite cathode foil unfilled with the conductive polymer, making it impossible to attain a sufficiently low ESR.

An object of the present invention is to provide an electrolytic capacitor with a low ESR, and to provide a method of manufacturing such an electrolytic capacitor.

Solution to Problem

To achieve the above object, according to one aspect of the present invention, an electrolytic capacitor having a capacitor element housed inside a body case, wherein the capacitor element has a first electrode member and a second electrode member wound up with a separator in between and the capacitor element holds an electrolyte solution, is structured as follows. The electrolytic capacitor further has, between the first and second electrode members, a conductive polymer particle band in which conductive polymer particles in a dense state are disposed to extend in the longitudinal direction of the separator. The conductive polymer particle band contains a cellulose derivative. The conductive polymer particle band is provided so as to cover, within at least one of the regions on opposite sides of the center line of the separator in its lateral direction, one half or more of the region in the lateral direction of the separator.

According to another aspect of the present invention, in the electrolytic capacitor structured as described above, preferably, the cellulose derivative is contained in the electrolyte solution.

According to another aspect of the present invention, in the electrolytic capacitor structured as described above, preferably, the cellulose derivative is a gelator that gelates water on being heated to 45° C. or higher.

According to another aspect of the present invention, in the electrolytic capacitor structured as described above, preferably, the cellulose derivative is one selected from the group consisting of methyl cellulose, hydroxyethylmethyl cellulose, hydroxyethylethyl cellulose, hydroxypropyl cellulose, and hydroxypropylmethyl cellulose.

According to another aspect of the present invention, in the electrolytic capacitor structured as described above, preferably, the conductive polymer particle band is provided so as to cover between opposite side parts of the separator in its lateral direction.

According to another aspect of the present invention, in the electrolytic capacitor structured as described above, preferably, the conductive polymer particle band is provided so as to cover between one end part and a central part of the separator in its lateral direction.

According to yet another aspect of the present invention, a method of manufacturing an electrolytic capacitor having a capacitor element housed inside a body case, wherein the capacitor element holds an electrolyte solution, includes:

a winding step of winding up a first electrode member and a second electrode member with a separator in between to form the capacitor element in the form of a roll;

a cellulose derivative immersion step of immersing the capacitor element in a water solution of a cellulose derivative;

a first drying step of drying the capacitor element taken out of the water solution;

a conducting polymer immersion step of, after the first drying step, immersing the capacitor element in a dispersion liquid of a conducting polymer;

a second drying step of drying the capacitor element taken out of the dispersion liquid; and an electrolyte liquid holding step of, after the second drying step, holding the electrolyte solution between the first and second electrode members.

According to a further aspect of the present invention, in the above method of manufacturing an electrolytic capacitor, preferably, in the second drying step, the capacitor element is dried in an environment of 45° C. or higher.

According to a further aspect of the present invention, in the above method of manufacturing an electrolytic capacitor, preferably, the cellulose derivative is one selected from the group consisting of methyl cellulose, hydroxyethylmethyl cellulose, hydroxyethylethyl cellulose, hydroxypropyl cellulose, and hydroxypropylmethyl cellulose.

Advantageous Effects of Invention

According to one aspect of the present invention, a conductive polymer particle band in which conductive polymer particles in a dense state are disposed to extend in the longitudinal direction of the separator is provided so as to cover, within at least one of the regions on opposite sides of the center line of the separator in its lateral direction, one half or more of the region in the lateral direction. Thus, the conductive polymer is disposed over a large area between the first and second electrode members. This helps reduce the ESR of the electrolytic capacitor.

According to another aspect of the present invention, the capacitor element having the first electrode member, the separator, and the second electrode member would up is first immersed in a water solution of a cellulose derivative and dried, and is then immersed in a dispersion liquid of a conductive polymer and dried. Thus, the dispersion liquid of the conductive polymer has increased viscosity resulting from the dissolution into it of the cellulose derivative held in the conductive polymer, and this slows down the axial movement of the dispersion medium during drying. This reduces the axial movement of particles of the conductive polymer, and permits the conductive polymer to be disposed over a large area between the first and second electrode members. This helps reduce the ESR of the electrolytic capacitor.

DESCRIPTION OF EMBODIMENTS

Figure 1:
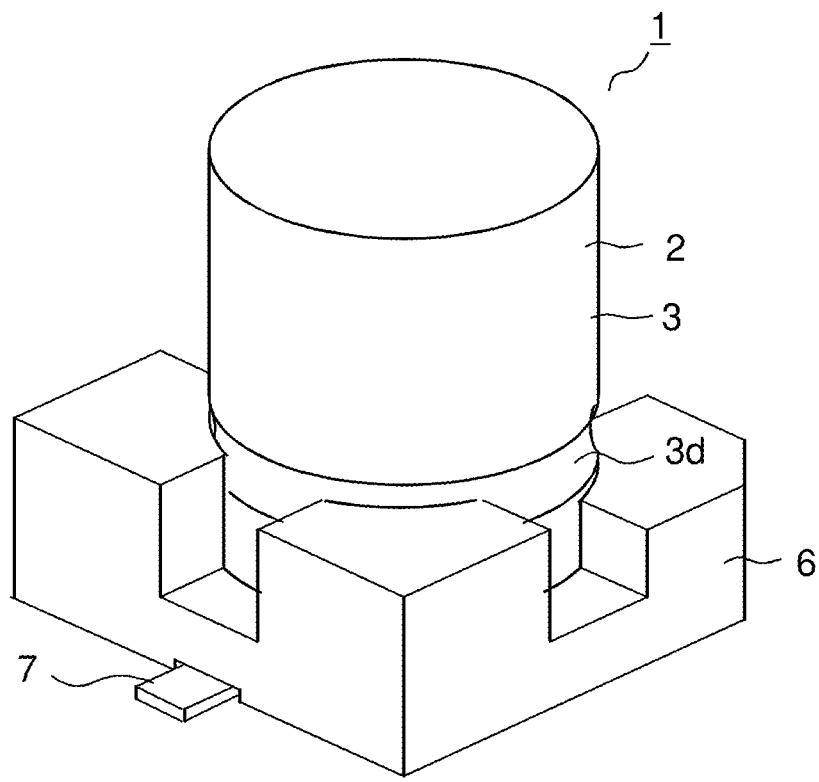
FIG. 1 is a perspective view showing an electrolytic capacitor according to one embodiment of the present invention as seen from above.
Figure 2:
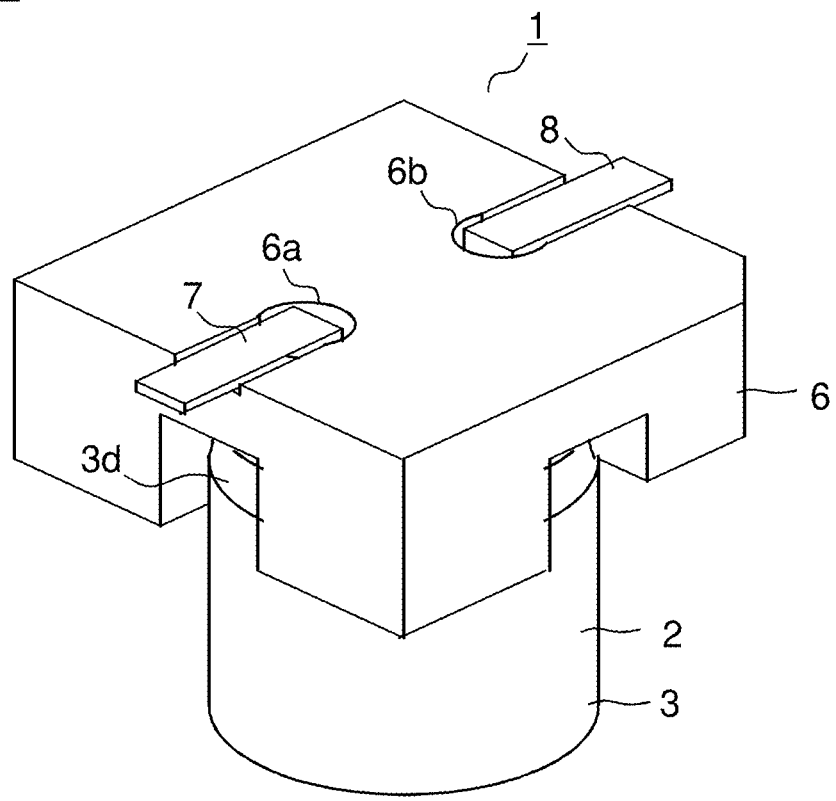
FIG. 2 is a perspective view showing an electrolytic capacitor according to one embodiment of the present invention as seen from below.

An embodiment of the present invention will be described below with reference to the accompanying drawings. FIGS. 1 and 2 are perspective views showing an electrolytic capacitor 1 according to one embodiment, as seen from above and from below respectively. The electrolytic capacitor 1 includes a capacitor body 2 and a seat plate 6. The seat plate 6 is formed of synthetic resin, and holds the capacitor body 2. The seat plate 6 has a pair of through holes 6a and 6b formed in it. Lead terminals 7 and 8 (described later) that are laid out of the capacitor body 2 are inserted through the through holes 6a and 6b and are bent, so as to be soldered to a circuit board.

Figure 3:
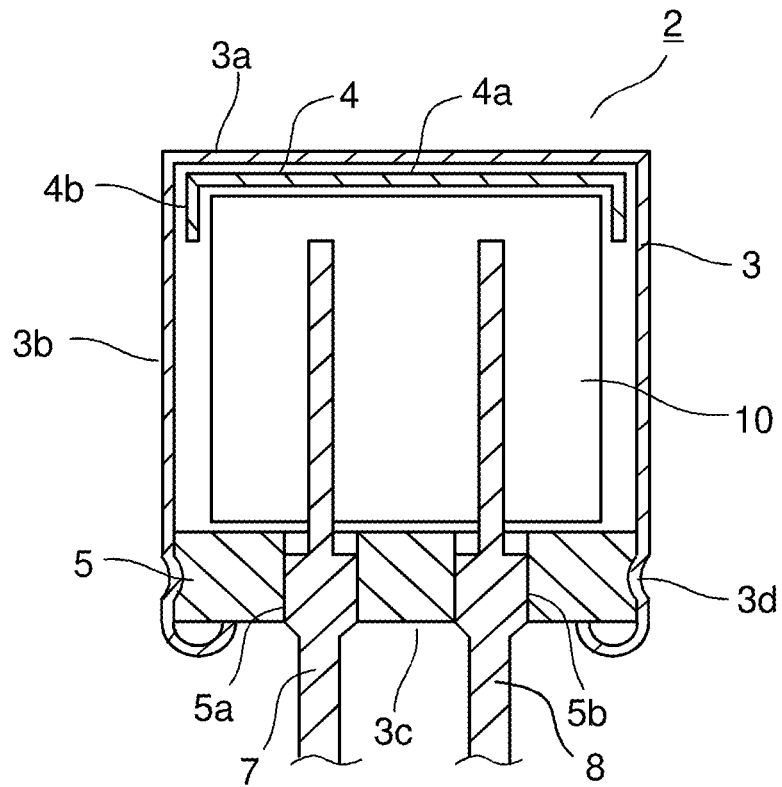
FIG. 3 is a front sectional view showing the body of an electrolytic capacitor according to one embodiment of the present invention.

FIG. 3 is a front sectional view of the capacitor body 2. The capacitor body 2 includes a body case 3, a capacitor element 10, an insulating sheet 4, and a sealing member 5. The body case 3 is formed of metal such as aluminum in the shape of a bottomed cylinder with a circular cross section. The cylindrical circumferential wall 3b of the body case 3 is at one end closed with an end wall 3a, and is at the other end left open to form an opening 3c.

The capacitor element 10 is housed inside the body case 3, and the lead terminals 7 and 8 that are connected to a first electrode member 11 and a second electrode member 12 (described later; see FIG. 4) respectively extend from the capacitor element 10.

The sealing member 5 is formed as a molding of an electrically insulating elastic material (such as rubber) in the shape of a disk, and has a pair of through holes 5a and 5b. With the sealing member 5 placed in the opening 3c of the body case 3, the circumferential face of the body case 3 is swaged to form a constriction 3d. Thus, the sealing member 5 is kept in position and the opening 3c of the body case 3 is sealed with the sealing member 5. At this time, the lead terminals 7 and 8 of the capacitor element 10 housed inside the body case 3 are pressed through the through holes 5a and 5b, and thus the capacitor element 10 is kept in position.

Figure 4:
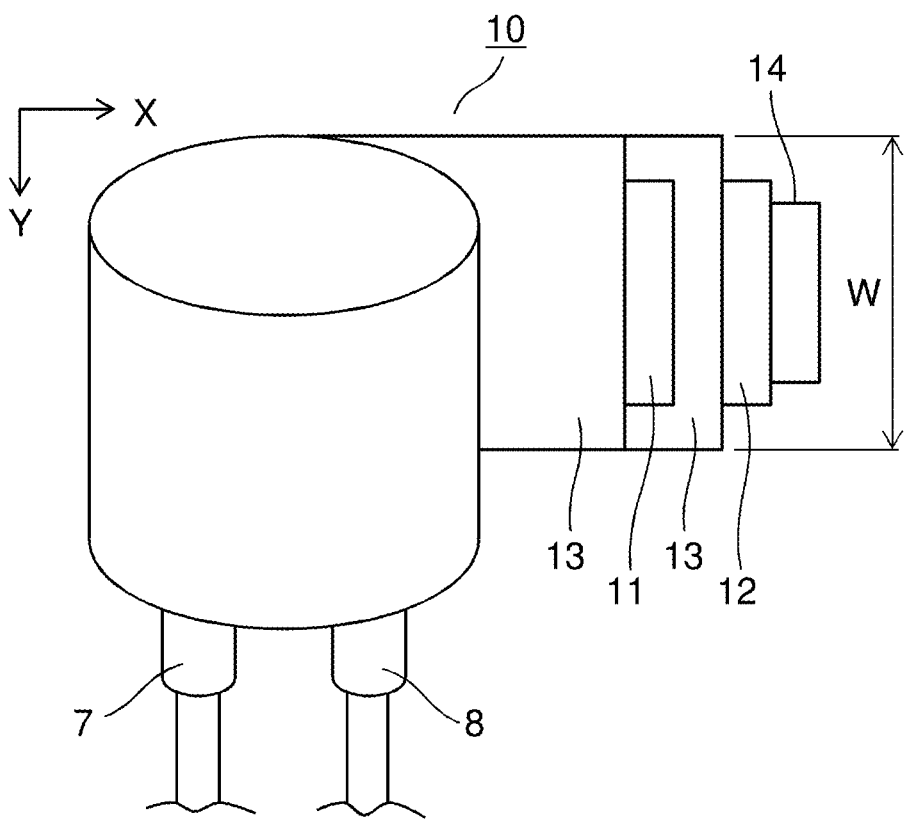
FIG. 4 is a perspective view showing the capacitor element in an electrolytic capacitor according to one embodiment of the present invention.

FIG. 4 is a perspective view of the capacitor element 10. The capacitor element 10 includes a first electrode member 11, a second electrode member 12, and a separator 13, of which each is an elongate member extending in a longitudinal direction (longer-side direction) X. The first and second electrode members 11 and 12 are, with the separator 13, which is an electrical insulator, in between, wound up into a roll. The terminal end of the first or second electrode member 11 or 12 is fastened with winding-end tape 14. To achieve insulation, the separator 13 is so formed that its width W in its lateral direction (shorter-side direction) Y is larger than the width of the first and second electrode members 11 and 12 in their lateral direction Y.

The first electrode member 11 is formed of a valve metal such as aluminum, tantalum, niobium, or titanium. Through chemical conversion treatment, the first electrode member 11 has a dielectric coat (not illustrated) of an oxide formed on its surface. The second electrode member 12 faces the first electrode member 11 across the separator 13, and is formed of aluminum or the like.

The lead terminal 7 is connected to the first electrode member 11, which has the dielectric coat, and the lead terminal 8 is connected to the second electrode member 12.

The first and second electrode members 11 and 12 can both have a dielectric coat formed on them.

The capacitor element 10 has an electrically conductive polymer disposed between the first and second electrode members 11 and 12. The capacitor element 10 also holds an electrolyte solution.

Figure 5:
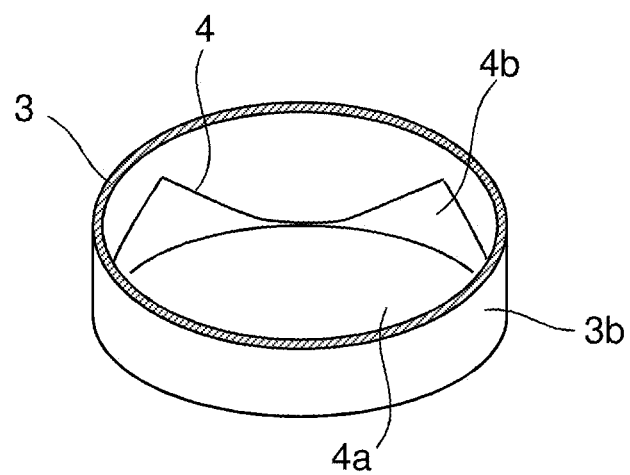
FIG. 5 is a perspective view showing an attached state of an insulator sheet in an electrolytic capacitor according to one embodiment of the present invention.
Figure 6:
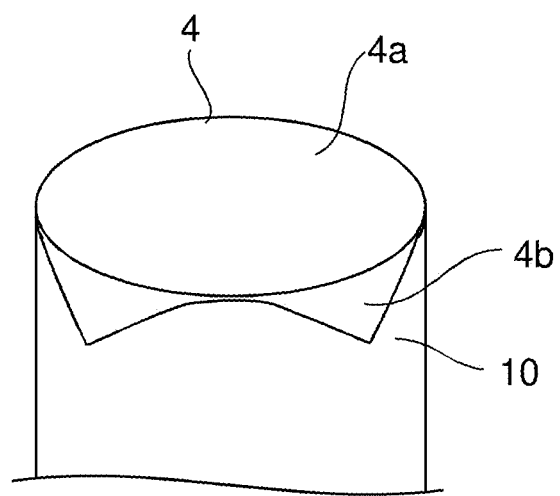
FIG. 6 is a perspective view showing an attached state of an insulator sheet in an electrolytic capacitor according to one embodiment of the present invention.

FIGS. 5 and 6 are perspective views showing an attached state of the insulating sheet 4. FIG. 5 is a diagram revealing the inside of the body case 3, and FIG. 6 shows a top part of the capacitor element 10 with the body case 3 removed.

The insulating sheet 4 is formed by stacking together layers of natural cellulose fiber or synthetic resin fiber, and is disposed between the end wall 3a of the body case 3 and the capacitor element 10. The insulating sheet 4 prevents short-circuiting between the first and second electrode members 11 and 12 via the body case 3.

The insulating sheet 4 is formed in a square (regular quadrilateral) shape, with a diagonal length larger than the inner diameter of the body case 3. Accordingly, the insulating sheet 4 has a bottom portion 4a, which lies on the end wall 3a (see FIG. 3) of the body case 3, and a side portion 4b, which bends from the bottom portion 4a and lies on the circumferential wall 3b. The insulating sheet 4 can be formed in a rectangular shape or in the shape of a parallelogram (which can be a rhombus).

The insulating sheet 4 can contain an antioxidant such as an antioxidant vitamin (e.g., vitamin C), an amine-based antioxidant, a phenol-based antioxidant, a phosphorus-based antioxidant, or an antioxidant sugar. This permits oxidizing substances, such as the air trapped in when the capacitor body 2 is sealed and the air leaking in during long-time use, to be absorbed or chemically converted into less oxidizing substances by the antioxidant. It is thus possible to alleviate the oxidization of the conductive polymer and thereby to alleviate the increase of the ESR of the electrolytic capacitor 1 with time.

Figure 7:
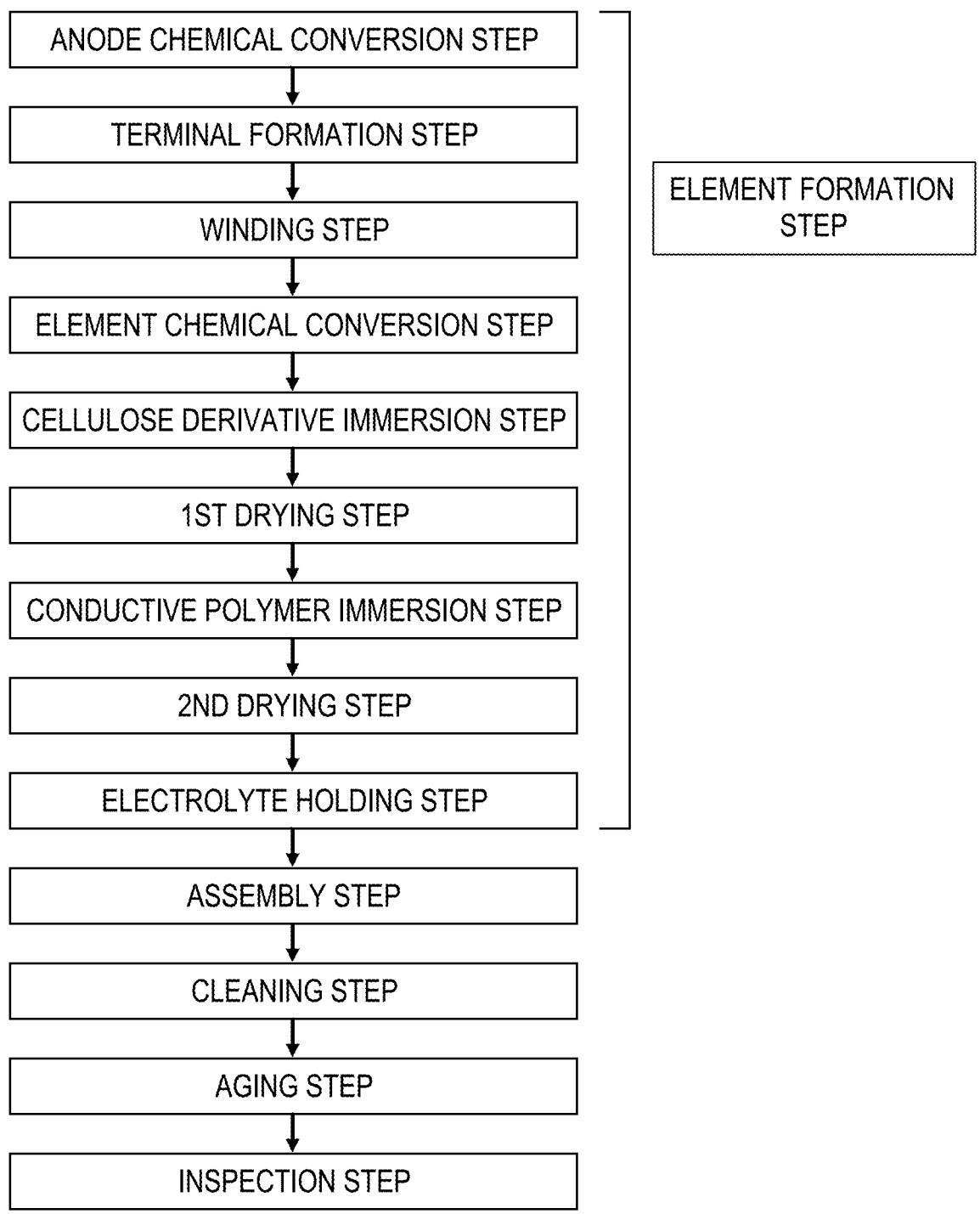
FIG. 7 is a process chart showing a manufacturing process of an electrolytic capacitor according to one embodiment of the present invention.

FIG. 7 is a process chart of a manufacturing process of the electrolytic capacitor 1. The electrolytic capacitor 1 is fabricated by sequentially performing, in the order named, an element formation step, an assembly step, a cleaning step, an aging step, and an inspection step. The element forming step, which is the step of forming the capacitor element 10, is achieved by sequentially performing, in the order named, an anode chemical conversion step, a terminal formation step, a winding step, an element chemical conversion step, a cellulose derivative immersion step, a first drying step, a conductive polymer immersion step, a second drying step, and an electrolyte holding step.

In the anode chemical conversion step, first, the surface of the first electrode member 11, which is formed of a valve metal, is etched into a coarse surface. The etched first electrode member 11 is anodically oxidized in a chemical conversion liquid so that its surface is coated with a dielectric coat of oxide film.

In the terminal formation step, lead tabs (not illustrated) of the lead terminals 7 and 8 are each crimp-connected to one end of the corresponding ones of the first and second electrode members 11 and 12.

In the winding step, the first and second electrode members 11 and 12 are wound up, with the separator 13 in between, to form the capacitor element 10 in the form of a roll. The terminal end of the capacitor element 10 is fastened with winding-end tape 14.

In the element chemical conversion step, the capacitor element 10 is immersed in a chemical conversion liquid to be anodically oxidized. This repairs defects in the dielectric coat that occur during the winding step or elsewhere.

Figure 8:
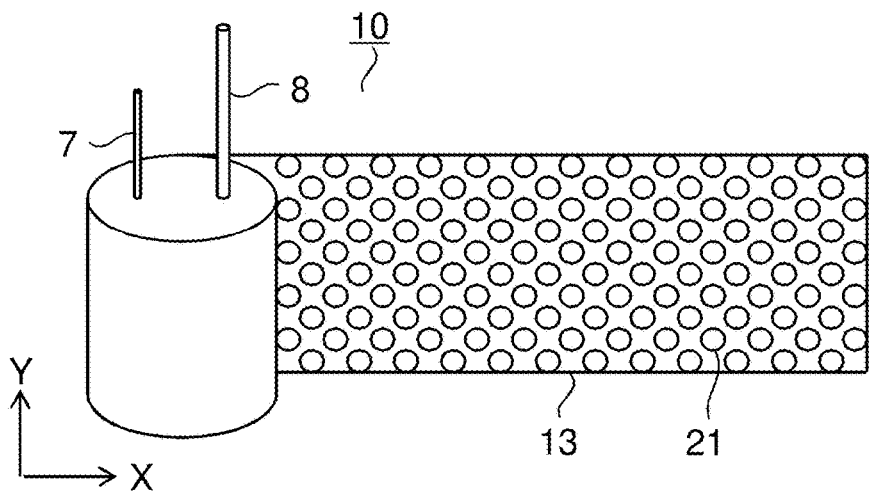
FIG. 8 is a perspective view illustrating a state of a capacitor element after a first drying step in an electrolytic capacitor according to one embodiment of the present invention.

In the cellulose derivative immersion step, the capacitor element 10 is immersed in a water solution of a cellulose derivative 21 (see FIG. 8). In the first drying step, the capacitor element 10 taken out of the water solution of the cellulose derivative 21 (FIG. 8) is dried.

FIG. 8 is a perspective view illustrating a state of the capacitor element 10 after the first drying step. Through the cellulose derivative immersion step, the water solution of the cellulose derivative 21 is held between the first and second electrode members 11 and 12, and through the first drying step, the solvent, namely water, evaporates. As a result, the cellulose derivative 21 deposits on the surfaces of the first and second electrode members 11 and 12 and of the separator 13.

While FIG. 8, and also FIGS. 9 and 10 referred to later, shows the surface of the separator 13, what is shown there applies equally to the surfaces of the first and second electrode members 11 and 12. Although, for the sake of convenience, those figures show the cellulose derivative 21 in the form of particles, in reality the cellulose derivative 21 is formed in the form of film.

Usable examples of the cellulose derivative 21 include methyl cellulose, ethyl cellulose, hydroxyethyl cellulose, hydroxypropyl cellulose, hydroxypropylmethyl cellulose, hydroxypropylethyl cellulose, ethylhydroxyethyl cellulose, hydroxyethylmethyl cellulose, hydroxyethylethyl cellulose, and carboxymethyl cellulose.

These cellulose derivatives 21, where the hydroxyl groups of cellulose are partly replaced and thus their intramolecular hydrogen bond is weakened, are easily soluble in water. Preferably, the capacitor element 10 is impregnated with a water solution of the cellulose derivative 21 in a concentration of 0.05% or more. This makes it easy to form a conductive polymer particle band 23 (see FIG. 9) with a large width in its lateral direction as will be described later. On the other hand, the capacitor element 10 can easily be impregnated with a water solution of the cellulose derivative 21 in a concentration of 2% or less.

With hydroxyalkyl cellulose such as hydroxyethyl cellulose, hydroxypropyl cellulose, and hydroxypropylmethyl cellulose, the hydroxyl groups can partly be replaced with fatty acid esters to obtain hydrophobicity. It is thus possible to adjust the water-solubility of hydroxyalkyl cellulose and thereby to prevent flocculation on dissolution into water.

In the conductive polymer immersion step, the capacitor element 10 is immersed in a dispersion liquid prepared by dispersing particles of an electrically conductive polymer 22 in a dispersion medium so that the capacitor element 10 is impregnated with the dispersion liquid. In the embodiment, water is used as the dispersion medium, and thus the capacitor element 10 is immersed in a water dispersion liquid of particles of the conductive polymer 22.

Through the immersion of the capacitor element 10 in the water dispersion liquid of the conductive polymer 22, each gap between the first and second electrode members 11 and 12 and the separator 13 is densely and uniformly filled with particles of the conductive polymer 22. On the hand, part of the cellulose derivative 21 that has deposited on the first and second electrode members 11 and 12 and the separator 13 dissolves into the dispersion liquid. As a result, the water dispersion liquid of the conductive polymer 22 has higher viscosity near the first and second electrode members 11 and 12 and the separator 13.

In the second drying step, the capacitor element 10 taken out of the water dispersion liquid of the conductive polymer 22 is dried. Preferably, the capacitor element 10 is dried at a temperature of 45° C. or higher (e.g., 100° C. to 200° C.) to achieve quick drying.

Figure 9:
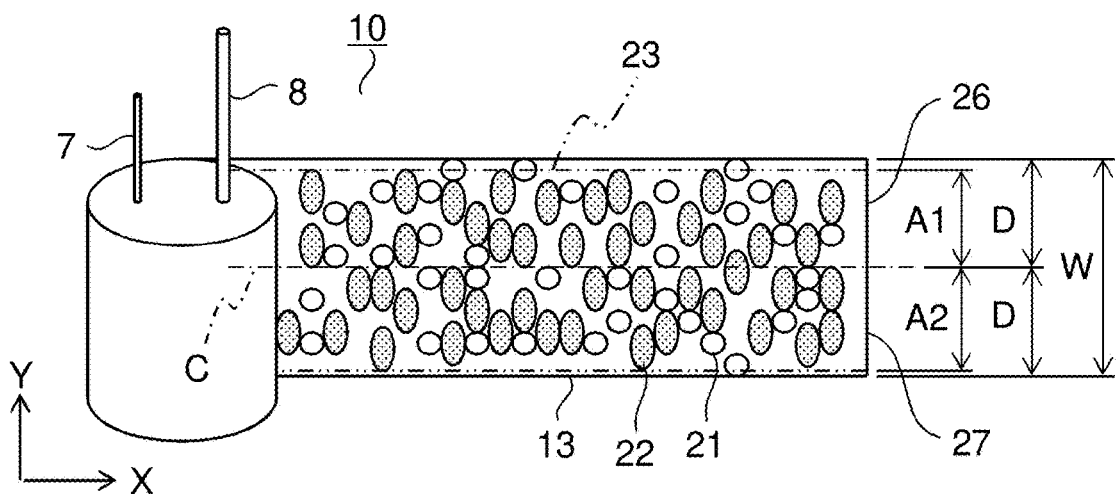
FIG. 9 is a perspective view illustrating a state of a capacitor element after a second drying step in an electrolytic capacitor according to one embodiment of the present invention.
Figure 10:
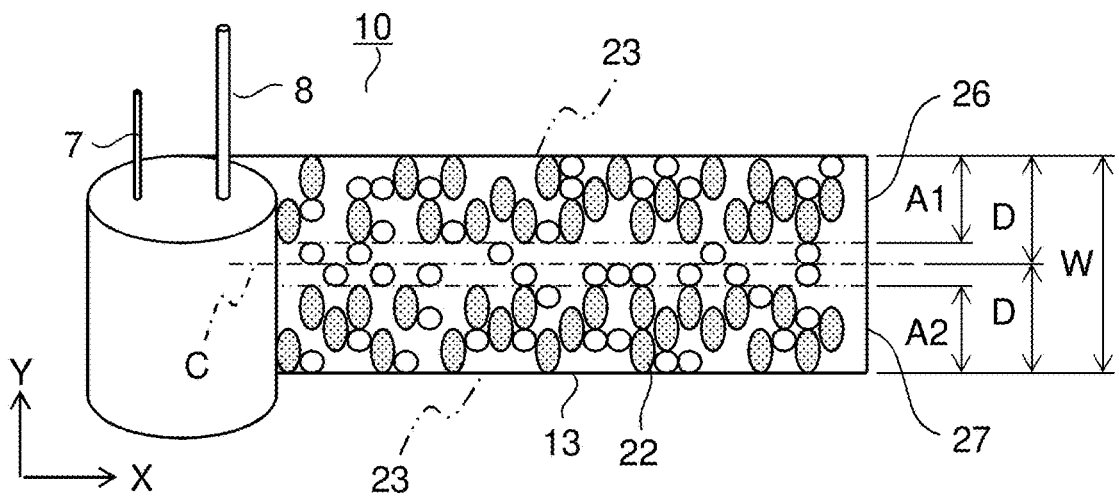
FIG. 10 is a perspective view illustrating another state of a capacitor element after a second drying step in an electrolytic capacitor according to one embodiment of the present invention.

FIG. 9 is a perspective view illustrating a state of the capacitor element 10 after the second drying step. The first and second electrode members 11 and 12 and the separator 13 are in close contact with each other radially. Thus, during drying, the dispersion medium of the water dispersion liquid of the conductive polymer 22 impregnated in the capacitor element 10 seeps out axially. At this time, the water dispersion liquid of the conductive polymer 22 in which the cellulose derivative 21 is dissolved has high viscosity even at the high temperature during drying, and thus water moves slowly.

Accordingly, the particles of the conductive polymer 22 on the first and second electrode members 11 and 12 and the separator 13 move little from their positions before drying. Thus, the particles of the conductive polymer 22, while keeping their positions before drying, deposit on the first and second electrode members 11 and 12 and the separator 13. In addition, the cellulose derivative 21 dissolved in the water dispersion liquid deposits, during drying, once again on the first and second electrode members 11 and 12 and the separator 13.

In this way, on the first and second electrode members 11 and 12 and the separator 13, the particles of the conductive polymer 22 that have deposited in the second drying step are disposed substantially continuously and uniformly. That is, between the first and second electrode members 11 and 12, a conductive polymer particle band 23 is formed in which particles of the conductive polymer 22 in a dense state extend in the longitudinal direction X of the separator 13. The conductive polymer particle band 23 contains the cellulose derivative 21 trapped inside the layer of particles of the conductive polymer 22 and the cellulose derivative 21 deposited once again in the second drying step.

Here, it is preferable to use as the cellulose derivative 21 a gelator that gelates water on being heated to 45° C. or higher. Then, when the capacitor element 10 is heated to an environment of 45° C. or higher and dried in the second drying step, the water dispersion liquid in which the cellulose derivative 21 is dissolved turns into a physical gel. Thus, water moves more slowly at a temperature as high as about 100° C., at which water boils, and the conductive polymer 22 moves accordingly less.

Usable examples of the gelator mentioned above include methyl cellulose, hydroxyethylmethyl cellulose, hydroxyethylethyl cellulose, hydroxypropyl cellulose, or hydroxypropylmethyl cellulose.

For easy understanding, in FIG. 9, the end edge of the conductive polymer particle band 23 in the lateral direction Y is shown to be away from the end edge of the separator 13 in the lateral direction Y. The water dispersion liquid of the conductive polymer 22 is impregnated into the capacitor element 10 starting at its end edge in the lateral direction Y, and thus, normally, the conductive polymer particle band 23 is formed starting at the end edge of the separator 13 in the lateral direction Y.

The conductive polymer particle band 23 is provided to cover between opposite end parts of the separator 13 in its lateral direction Y. That is, the conductive polymer particle band 23 is formed within a first region 26 and a second region 27 divided by the center line C of separator 13 in its lateral direction Y. The width D of the first and second regions 26 and 27 in their lateral direction Y equals one half of the width W of the separator 13 in its lateral direction Y.

Here, the width A1 in the lateral direction Y of the conductive polymer particle band 23 within the first region 26 is equal to or greater than one half of the width D in the lateral direction Y of the first region 26. Likewise, the width A2 in the lateral direction Y of the conductive polymer particle band 23 within the second region 27 is equal to or greater than one half of the width D in the lateral direction Y of the second region 27.

Thus, the conductive polymer 22 lies with little unevenness over a large area on the first and second electrode members 11 and 12 and the separator 13. This makes it possible to reduce the ESR of the electrolytic capacitor.

A cellulose derivative 21 with high viscosity leads to high viscosity in the water dispersion liquid of the conductive polymer 22, and this may prevent the water dispersion liquid from impregnating deep into the capacitor element 10. FIG. 10 is a perspective view illustrating the capacitor element 10 in such a state after the second drying step. The water dispersion liquid that impregnates into the capacitor element 10 starting at its end edge in the lateral direction Y does not reach the center line C. Thus, the conductive polymer particle band 23 is formed divided in the lateral direction Y.

Also here, as described above, the width A1 in the lateral direction Y of the conductive polymer particle band 23 within the first region 26 is equal to or greater than one half of the width D in the lateral direction Y of the first region 26. Likewise, the width A2 in the lateral direction Y of the conductive polymer particle band 23 within the second region 27 is equal to or greater than one half of the width D in the lateral direction Y of the second region 27. This helps reduce the ESR of the electrolytic capacitor 1.

In the conductive polymer immersion step, only one axial end part of the capacitor element 10 may be immersed in the water dispersion liquid of the conductive polymer, without another axial end part of the capacitor element 10 immersed in the water dispersion liquid. In this way, the conductive polymer particle band 23 is formed to cover between one end part and a central part of the separator 13 in its lateral direction Y. Here, if the conductive polymer particle band 23 is formed so as to cover, within at least one of the first and second regions 26 and 27, one half or more of the region in the lateral direction Y, the conductive polymer 22 is disposed over as large an area as described above.

In the electrolyte holding step, the capacitor element 10 is immersed in a non-aqueous electrolyte solution. This results in the electrolyte solution being held in the capacitor element 10. The capacitor element 10 contains, in a form suspended in it, the cellulose derivative 21 on the first and second electrode members 11 and 12 and the separator 13 (see FIG. 9). The electrolyte solution has an electrolyte, which can be an organic acid or an organic acid salt, dissolved in a polar solvent such as γ-butyrolactone. One usable example of the electrolyte solution is a solution of borodisalicylic acid in γ-butyrolactone.

The concentration of the electrolyte in the solvent is not subject to any particular restriction, and can be, for example, 5 to 50% by weight. The duration of the immersion of the capacitor element 10 varies according to its size, and can be, for example, one second to several hours, preferably one second to five minutes. The temperature of the immersion of the capacitor element 10 is not subject to any particular restriction, and can be, for example, 0° C. to 80° C., preferably 10° C. to 40° C.

In the assembly step, the sealing member 5 is attached to the opening 3c of the body case 3. Then a part of the circumferential face of the body case 3 around the sealing member 5 is swaged to form the constriction 3d, and the circumferential edge of the opening 3c is curled. In this way, the body case 3 with the capacitor element 10 housed inside it is sealed.

In the cleaning step, blots resulting from the electrolyte solution adhering to the outer face of the body case 3 is removed. In the aging step, while a rated voltage or a voltage higher than the rated voltage is applied between the lead terminals 7 and 8, aging is performed, for example, for about one hour at a temperature of about 125° C. Aging repairs defects in the dielectric coat that occur on the cut faces of the first electrode member 11, on the connected part of the lead terminal 7, and the like.

In the inspection step, the electrolytic capacitor 1 is inspected in terms of exterior appearance and characteristics. Now, the electrolytic capacitor 1 is finished.

According to the embodiment, a conductive polymer particle band 23, in which particles of the conductive polymer 22 in a dense state extends in the longitudinal direction X of the separator 13, is disposed between the first and second electrode members 11 and 12. The conductive polymer particle band 23 is provided so as to cover, within at least one of the regions (a first region 26 and a second region 27) on opposite sides of the center line C of the separator 13 in its lateral direction Y, one half or more of the separator 13 in its lateral direction Y. Thus, the conductive polymer 22 is disposed over a large area between the first and second electrode members 11 and 12. This helps reduce the ESR of the electrolytic capacitor 1. Here, the conductive polymer particle band 23 contains a cellulose derivative 21.

Owing to the electrolyte solution containing the cellulose derivative 21, the electrolyte solution has increased viscosity. This reduces the evaporation of the electrolyte solution in a high-temperature environment, and helps alleviate the increase of the ESR of the electrolytic capacitor 1 with time.

Using as the cellulose derivative 21 a gelator that gelates water on being heated at 45° C. or higher permits, when the cellulose derivative immersion step, the first drying step, the conductive polymer immersion step, and the second drying step are sequentially performed in the order named, the water in which the cellulose derivative 21 is dissolved to turn into a physical gel in the second drying step. This helps reduce the movement of particles of the conductive polymer 22 and thereby to dispose the conductive polymer 22 over a large area easily.

Using as the cellulose derivative 21 one of methyl cellulose, hydroxyethylmethyl cellulose, hydroxyethylethyl cellulose, hydroxypropyl cellulose, or hydroxypropylmethyl cellulose makes it easy to turn the water in which the cellulose derivative 21 is dissolved into a physical gel.

Owing to the conductive polymer particle band 23 being provided to cover between opposite end parts of the separator 13 in its lateral direction Y, the conductive polymer 22 is disposed over a wider area between the first and second electrode members 11 and 12. This helps further reduce the ESR of the electrolytic capacitor 1.

Providing the conductive polymer 22 to cover between one end part and a central part of the separator 13 in its lateral direction Y permits the conductive polymer 22 to be disposed over a wider area between the first and second electrode members 11 and 12. This helps further reduce the ESR of the electrolytic capacitor 1.

In the cellulose derivative immersion step, the capacitor element 10 is immersed in a water solution of the cellulose derivative 21, and in the first drying step, the capacitor element 10 is dried. Then, in the conductive polymer immersion step, the capacitor element 10 is immersed in a dispersion liquid of the conductive polymer 22, and in the second drying step, the capacitor element 10 is dried. Through these steps, the dispersion liquid of the conductive polymer 22 comes to have high viscosity resulting from the dissolution into it of the cellulose derivative 21 held in the capacitor element 10, and this slows down the axial movement of the dispersion medium during drying. This helps reduce the axial movement of particles of the conductive polymer 22, and permits the conductive polymer 22 to be disposed over a large area between the first and second electrode members 11 and 12. This helps further reduce the ESR of the electrolytic capacitor 1.

In the second drying step, the capacitor element 10 is dried in an environment of 45° C. or higher. Thus, using as the cellulose derivative 21 a gelator permits the water in which the cellulose derivative 21 is dissolved to turn into a physical gel. This further slows down the axial movement of the dispersion medium of the conductive polymer 22 during drying, and helps further reduce the movement of particles of the conductive polymer 22.

A description will now be given of some practical examples and a comparative example implemented to evaluate the characteristics of the electrolytic capacitor 1 according to the embodiment.

Practical Example 1

For the electrolytic capacitor 1 of Practical Example 1, a body case 3 with external dimensions of ϕ6.3 mm×H 7.7 mm (6.3 mm across by 7.7 mm high) was used, and a capacitor element 10 with ratings of 63 V, 15 μF was prepared. The electrolyte used was a solution of borodisalicylic acid in γ-butyrolactone.

In the cellulose derivative immersion step, the capacitor element 10 was immersed in a water solution of hydroxypropylmethyl cellulose. The hydroxypropylmethyl cellulose used was NEOVISCO (registered trademark) MC HM4000S manufactured by SANSHO Co., Ltd. The water solution of the cellulose derivative had a concentration of 0.5%.

Practical Example 2

For the electrolytic capacitor 1 of Practical Example 2, in the cellulose derivative immersion step, the same hydroxypropylmethyl cellulose as in Practical Example 1 was used, and the water solution had a concentration of 1.0%. The other conditions were the same as in Practical Example 1.

Practical Example 3

For the electrolytic capacitor 1 of Practical Example 3, in the cellulose derivative immersion step, hydroxypropylmethyl cellulose (NEOVISCO MC RM4000 manufactured by SANSHO Co., Ltd.) with the same viscosity as but a higher gelation temperature than that in Practical Example 1 was used. The water solution of the cellulose derivative had a concentration of 0.5%. The other conditions were the same as in Practical Example 1.

Practical Example 4

For the electrolytic capacitor 1 of Practical Example 4, in the cellulose derivative immersion step, the same hydroxypropylmethyl cellulose as in Practical Example 3 was used, and the water solution had a concentration of 1.0%. The other conditions were the same as in Practical Example 3.

Practical Example 5

For the electrolytic capacitor 1 of Practical Example 5, in the cellulose derivative immersion step, hydroxypropylmethyl cellulose (NEOVISCO MC RM15000S manufactured by SANSHO Co., Ltd.) with higher viscosity than but the same higher gelation temperature as that in Practical Example 3 was used. The water solution of the cellulose derivative had a concentration of 0.5%. The other conditions were the same as for Practical Example 3.

Practical Example 6

For the electrolytic capacitor 1 of Practical Example 6, in the cellulose derivative immersion step, the same hydroxypropylmethyl cellulose as in Practical Example 5 was used, and the water solution had a concentration of 1.0%. The other conditions were the same as in Practical Example 5.

Practical Example 7

For the electrolytic capacitor 1 of Practical Example 7, in the cellulose derivative immersion step, hydroxypropylmethyl cellulose (NEOVISCO MC RM30000S manufactured by SANSHO Co., Ltd.) with higher viscosity than but the same higher gelation temperature as that in Practical Example 5 was used. The water solution of the cellulose derivative had a concentration of 0.5%. The other conditions were the same as for Practical Example 5.

Practical Example 8

For the electrolytic capacitor 1 of Practical Example 8, in the cellulose derivative immersion step, the same hydroxypropylmethyl cellulose as in Practical Example 7 was used, and the water solution had a concentration of 1.0%. The other conditions were the same as in Practical Example 7.

COMPARATIVE EXAMPLE

As a comparative example, an electrolytic capacitor 1 was fabricated without the cellulose derivative immersion step performed. Except the omission of the cellulose derivative immersion step, the conditions were the same as in Practical Example 1.

TABLE 1

| | Ratings | Cellulose Derivative Water Solution | | ESR (mΩ) |
| --- | --- | --- | --- | --- |
| | | Type | Concentration(%) | |
| Practical Example 1 | 63 V, 15 μF | NEOVISCO MC HM4000S | 0.5 | 26.1 |
| Practical Example 2 | | | 1.0 | 33.2 |
| Practical Example 3 | | NEOVISCO MC RM4000 | 0.5 | 22.6 |
| Practical Example 4 | | | 1.0 | 30.9 |
| Practical Example 5 | | NEOVISCO MC RM15000S | 0.5 | 26.6 |
| Practical Example 6 | | | 1.0 | 33.3 |
| Practical Example 7 | | NEOVISCO MC RM30000S | 0.5 | 29.3 |
| Practical Example 8 | | | 1.0 | 46.7 |
| Comparative Example | | | N/A | 52.4 |

Table 1 shows the results of ESR measurement (in milliohms) with each of the practical and comparative examples at 100 kHz. As Table 1 reveals, while the electrolytic capacitors of Practical Examples 1 to 8 had low ESRs, Comparative Example had a high ESR. From the results it is seen that performing a cellulose derivative immersion step and forming a conductive polymer particle band 23 with a large width in its lateral direction Y helps reduce the ESR of the electrolytic capacitor 1.

In Practical Examples 1 to 7, as shown in FIG. 9 referred to previously, the conductive polymer particle band 23 was formed to cover between opposite end parts of the separator 13 in its lateral direction Y. In Practical Example 8, where the cellulose derivative had high viscosity and a high concentration, as shown in FIG. 10 referred to previously, the conductive polymer particle band 23 was formed divided in the lateral direction Y of the separator 13.

Figure 11:
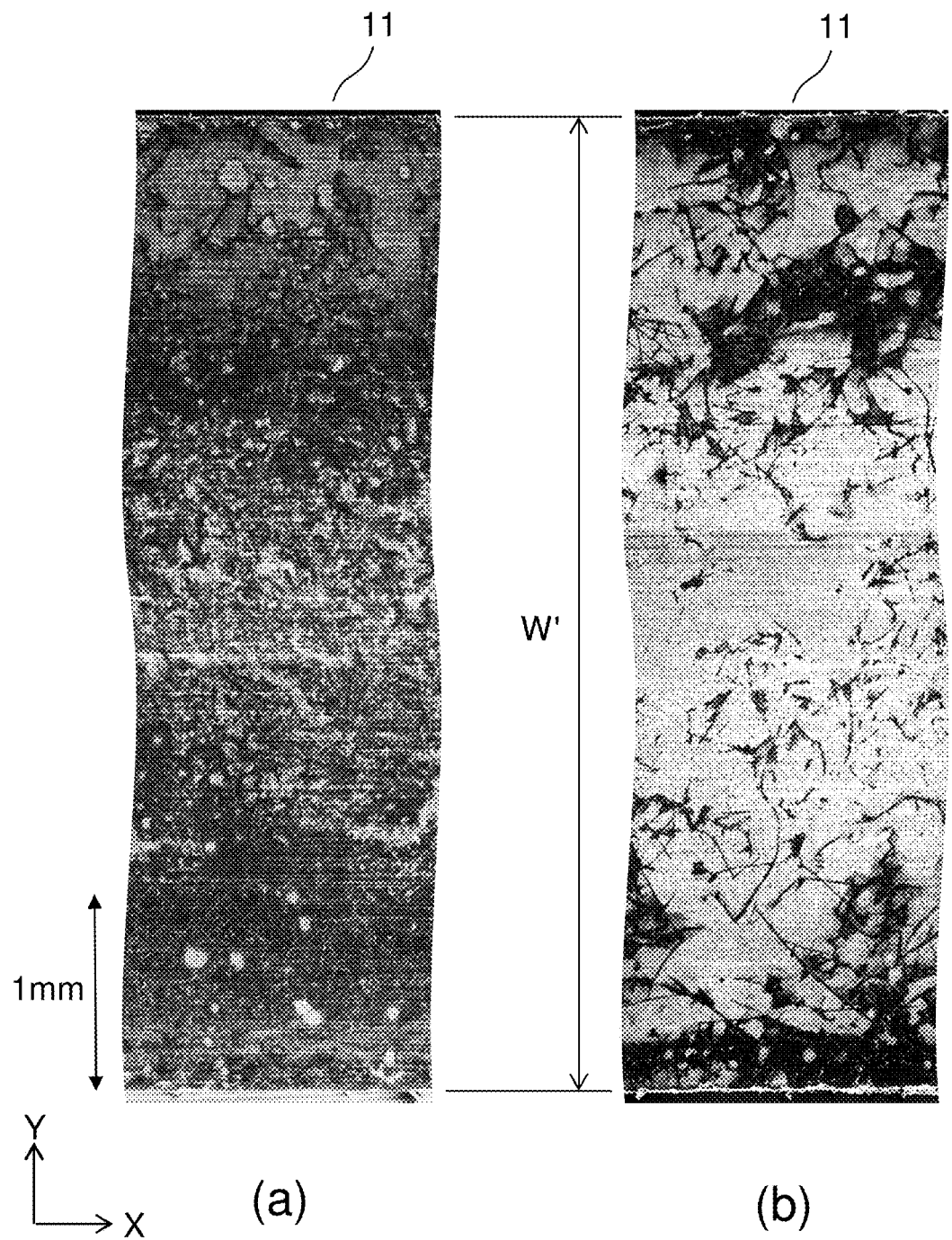
FIG. 11 presents photographs each showing a first electrode member in an electrolytic capacitor, according to one embodiment of the present invention and according to a comparative example respectively.

FIG. 11 presents photographs (a) and (b) taken with a SEM (scanning electron microscope) of the first electrode member 11 in Practical Example 1 and in Comparative Example respectively. There the width W' of the first electrode member 11 in its lateral direction Y is 5 mm. The black parts within the first electrode member 11 are where the conductive polymer 22 is present.

FIG. 11 shows that, in Practical Example 1, the conductive polymer particle band 23, where particles of the conductive polymer 22 are densely distributed, extends in the longitudinal direction X and is formed with a large width in the lateral direction Y. By contrast, in Comparative Example, the conductive polymer 22 concentrates in opposite end parts in the lateral direction Y and is sparsely distributed in a central part. This makes it possible to obtain a lower ESR in Practical Example 1 than in Comparative Example.

INDUSTRIAL APPLICABILITY

The present invention finds applications in electrolytic capacitors as well as in automobiles, electronic devices, and the like that include electrolytic capacitors in their control circuits.

REFERENCE SIGNS LIST 1 electrolytic capacitor
2 capacitor body
3 body case
3a end wall
3b circumferential wall
4 insulating sheet
5 sealing member
6 seat plate
7, 8 lead terminal
10 capacitor element
11 first electrode member
12 second electrode member
13 separator
14 tape
21 cellulose derivative
22 conductive polymer
23 conductive polymer particle band
26 first region
27 second region
C center line

The invention claimed is:

1. An electrolytic capacitor having a capacitor element housed inside a body case, the capacitor element having a first electrode member and a second electrode member wound up with a separator in between, the capacitor element holding an electrolyte solution, wherein the electrolytic capacitor further has, between the first and second electrode members, a conductive polymer particle band in which conductive polymer particles in a dense state are disposed to extend in a longitudinal direction of the separator, the conductive polymer particle band contains a cellulose derivative, the conductive polymer particle band is divided in a lateral direction of the separator, the conductive polymer particle band covers, within at least one of regions on opposite sides of a center line of the separator in the lateral direction thereof, one half or more of the region in the lateral direction, a first region of the conductive polymer particle band is on a first side of the center line and a second region of the conductive polymer particle band is on a second side of the center line, and in the lateral direction, the first region is separated from the second region.

2. The electrolytic capacitor according to claim 1, wherein the cellulose derivative is contained in the electrolyte solution.

3. The electrolytic capacitor according to claim 2, wherein the cellulose derivative is a gelator that gelates water on being heated to 45° C. or higher.

4. The electrolytic capacitor according to claim 3, wherein the cellulose derivative is one selected from the group consisting of methyl cellulose, hydroxyethylmethyl cellulose, hydroxyethylethyl cellulose, hydroxypropyl cellulose, and hydroxypropylmethyl cellulose.

5. The electrolytic capacitor according to claim 1, wherein the cellulose derivative is a gelator that gelates water on being heated to 45° C. or higher.

6. The electrolytic capacitor according to claim 5, wherein the cellulose derivative is one selected from the group consisting of methyl cellulose, hydroxyethylmethyl cellulose, hydroxyethylethyl cellulose, hydroxypropyl cellulose, and hydroxypropylmethyl cellulose.

7. The electrolytic capacitor according to claim 1, wherein the cellulose derivative is formed in a form of a film on surfaces of the separator, the first electrode member, and the second electrode member.

8. A method of manufacturing an electrolytic capacitor having a capacitor element housed inside a body case, the capacitor element holding an electrolyte solution, the method comprising:

a winding step of winding up a first electrode member and a second electrode member with a separator in between to form the capacitor element in a form of a roll;

a cellulose derivative immersion step of immersing the capacitor element in a water solution of a cellulose derivative;

a first drying step of drying the capacitor element taken out of the water solution and forming the cellulose derivative in a form of a film on surfaces of the separator, the first electrode member, and the second electrode member;

a conducting polymer immersion step of, after the first drying step, immersing the capacitor element in a dispersion liquid of a conducting polymer;

a second drying step of drying the capacitor element taken out of the dispersion liquid; and an electrolyte liquid holding step of, after the second drying step, holding the electrolyte solution between the first and second electrode members, wherein, in the conducting polymer immersion step, the dispersion liquid solution impregnates into the capacitor element starting at an end edge and does not reach a center line of the capacitor element.

9. The method according to claim 8, wherein in the second drying step, the capacitor element is dried in an environment of 45° C. or higher.

10. The method according to claim 9, wherein the cellulose derivative is one selected from the group consisting of methyl cellulose, hydroxyethylmethyl cellulose, hydroxyethylethyl cellulose, hydroxypropyl cellulose, and hydroxypropylmethyl cellulose.

11. The method according to claim 8, wherein, in the cellulose derivative immersion step, the water solution of the cellulose derivative has a concentration of 0.05% to 2%.

12. The method according to claim 8, wherein, in the cellulose derivative immersion step, the water solution of the cellulose derivative has a concentration of 0.5% to 1%.

13. A method of manufacturing an electrolytic capacitor having a capacitor element housed inside a body case, the capacitor element holding an electrolyte solution, the method comprising:

a winding step of winding up a first electrode member and a second electrode member with a separator in between to form the capacitor element in a form of a roll;

a cellulose derivative immersion step of immersing the capacitor element in a water solution of a cellulose derivative;

a first drying step of drying the capacitor element taken out of the water solution and forming the cellulose derivative in a form of a film on surfaces of the separator, the first electrode member, and the second electrode member;

a conducting polymer immersion step of, after the first drying step, immersing the capacitor element in a dispersion liquid of a conducting polymer;

a second drying step of drying the capacitor element taken out of the dispersion liquid; and an electrolyte liquid holding step of, after the second drying step, holding the electrolyte solution between the first and second electrode members, wherein the cellulose derivative immersion step, the first drying step, the conducting polymer immersion step, and the second drying step form a conductive polymer particle band, wherein the conductive polymer particle band includes conductive polymer particles and the cellulose derivative, wherein the conductive polymer particle band is divided in a lateral direction of the separator into a first region and a second region, wherein the first region of the conductive polymer particle band is on a first side of a center line of the separator in the lateral direction thereof and the second region of the conductive polymer particle band is on a second side of the center line in the lateral direction thereof, and wherein, in the lateral direction, the first region is separated from the second region.

14. The method according to claim 13, wherein at least one of (a) the first region of the conductive polymer particle band covers surfaces of the separator, the first electrode member, and the second electrode member of the first axial end part one half or more in the lateral direction and (b) the second region of the conductive polymer particle band covers surfaces of the separator, the first electrode member, and the second electrode member of the second axial end part one half or more in the lateral direction.

\* \* \* \* \*